United States Patent [19]

Reinersman

[11] Patent Number: 5,584,359
[45] Date of Patent: Dec. 17, 1996

[54] DETACHABLE WHEEL BEARING LUBRICATOR

[76] Inventor: Phillip N. Reinersman, 8731 Pawnee, Tampa, Fla. 33617

[21] Appl. No.: 615,712

[22] Filed: Mar. 13, 1996

[51] Int. Cl.$^6$ ..................................................... F16C 1/24
[52] U.S. Cl. .................. 184/5.1; 184/38.3; 184/45.1; 184/48.1; 184/48.2; 301/105.1; 301/108.1; 222/386; 222/390; 384/471; 384/473; 384/400
[58] Field of Search ..................... 184/5.1, 38.3, 184/45.1, 45.2, 48.1, 48.2; 301/105.1, 108.1; 222/327, 386, 387, 390; 384/397, 400, 471, 473; 92/17; 403/37, 38, 342, 343

[56] References Cited

U.S. PATENT DOCUMENTS

| | | | |
|---|---|---|---|
| 839,539 | 12/1906 | Beebe | 184/38.3 |
| 855,889 | 6/1907 | Hunter | 184/38.3 |
| 1,259,741 | 3/1918 | Horwitz | 222/390 |
| 1,872,279 | 8/1932 | Hallett | 184/45.1 |
| 2,514,799 | 7/1950 | Rubertino et al. | 184/5.1 |
| 3,077,948 | 2/1963 | Law | 184/45.1 |
| 3,785,706 | 1/1974 | Vangalis | 184/45.1 |
| 4,058,185 | 11/1977 | Ploeger | 184/45.1 |
| 4,932,499 | 6/1990 | Covert et al. | 184/5.1 |
| 5,054,859 | 10/1991 | Goettker | 184/45.1 |
| 5,303,800 | 4/1994 | Persson | 184/5.1 |

Primary Examiner—Edward K. Look
Assistant Examiner—Christopher Verdier
Attorney, Agent, or Firm—Dominik & Stein

[57] ABSTRACT

A detectable wheel bearing lubricator for lubricating bearings in a wheel hub that includes an adapter for securely coupling to a wheel hub at one end and a lubrication assembly that is releasably coupled to the other end of the adapter thereby facilitating the removal thereof from the adapter for replacement and lubricant replenishment.

17 Claims, 3 Drawing Sheets

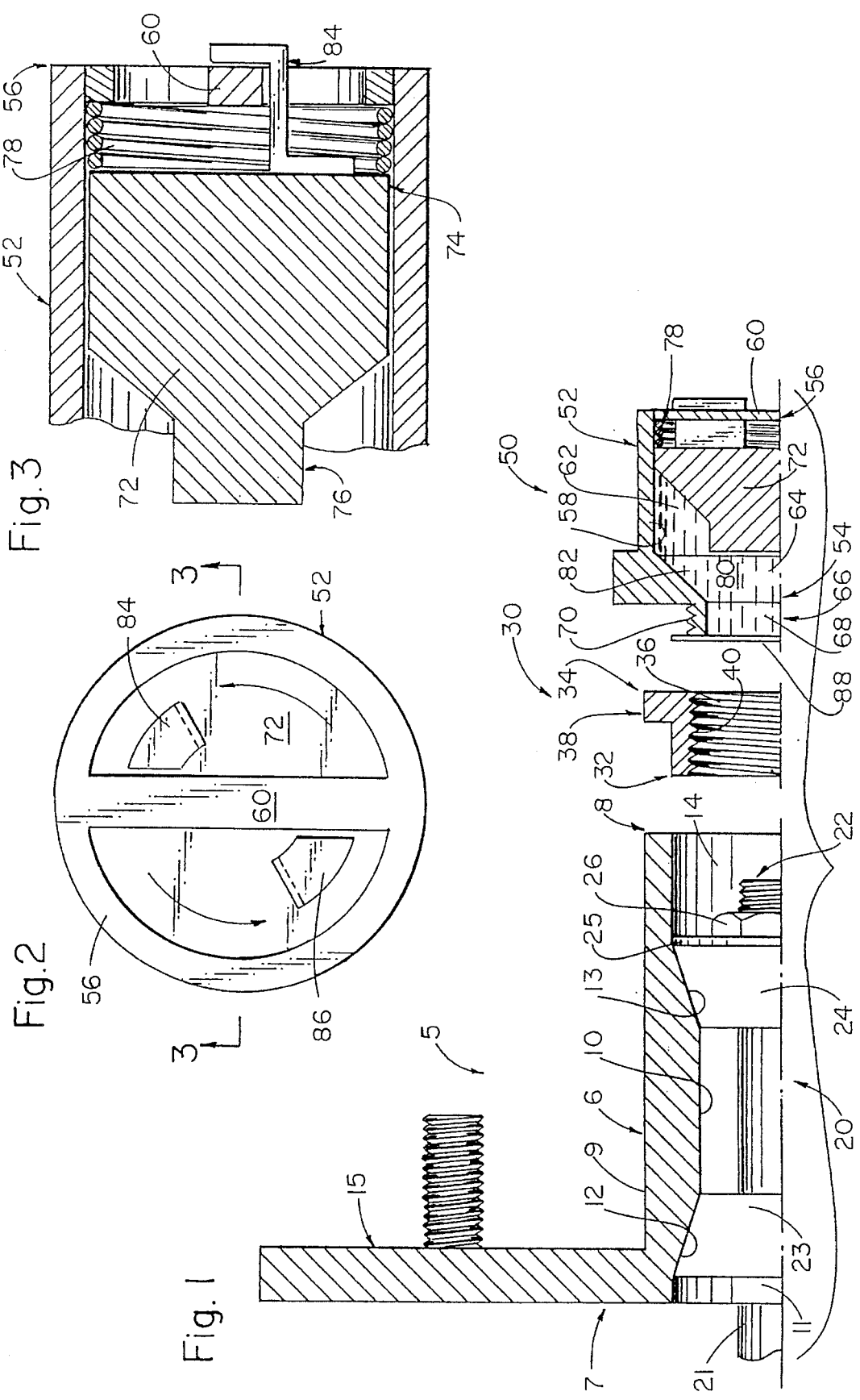

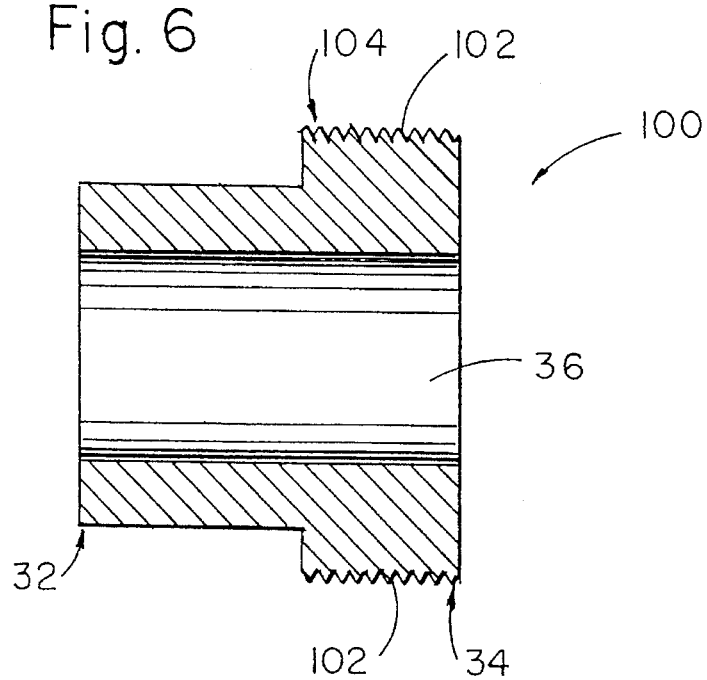
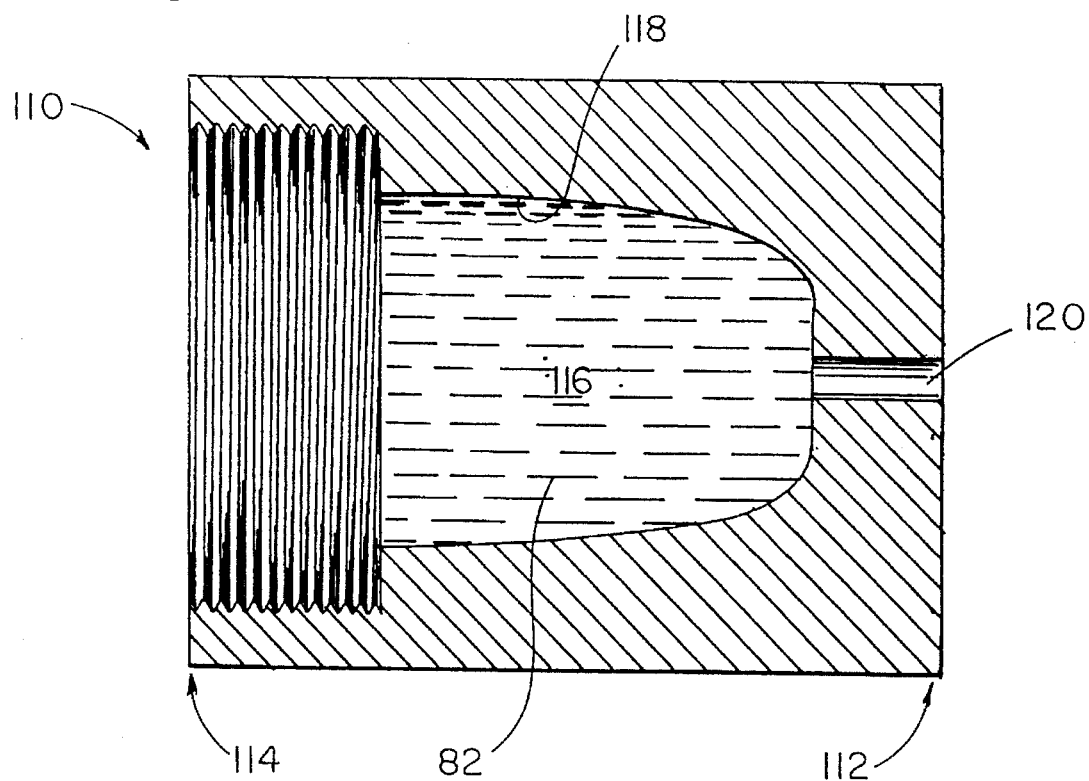

5,584,359

DETACHABLE WHEEL BEARING LUBRICATOR

BACKGROUND OF THE INVENTION

1. Field of the Invention

This invention relates to a bearing lubricator and, more particularly, to a detachable wheel bearing lubricator that facilitates easy replacement or refilling thereof.

2. Description of the Background Art

Presently, there exists many various types of lubrication devices for lubricating bearings within a wheel hub. Of the many various types common in the industry today, many require the use of a grease gun or other additional device to refill or repack the lubricating device with lubricant. Other types of lubricating devices are of complex designs utilizing gas pressures to continually force a lubricant onto the bearings in the wheel hub.

However, no current bearing lubricator designs are readily detachable from the wheel hub after being initially installed. Thus, any replacement of the lubricators currently available today is difficult and troublesome. Hence, most users do not attempt to remove the bearing lubricators and are reduced to being forced to carry a grease gun or other additional device in order to refill the lubricator when replenishing is required.

Representative of the various types of lubricator designs currently available today in the industry are those disclosed in U.S. Pat. Nos. 5,423,399; 5,303,800; 5,178,233; 5,054,859; 4,941,550; 4,293,056; 4,190,133; 4,106,816; and 4,058,185, the disclosures of which are hereby incorporated by reference herein.

In U.S. Pat. Nos. 4,058,185 and 4,190,133, issued to Ploeger, the lubricators require the use of a grease gun for refilling as well as do not provide for ready removal from the wheel hub thereby rendering replacement and lubricant replenishment difficult and troublesome. The wheel bearing lubricators as disclosed in the Ploeger patents are generally self-lubricating devices that utilize a spring-loaded plate member which is slidably mounted in the lubricator body so to continually force lubricant onto the wheel bearings.

U.S. Pat. No. 4,106,816, issued to August, is another example of a wheel bearing lubricator that utilizes a spring-loaded plate member to continually force lubricant onto wheel bearings within a wheel hub. Similarly, the bearing lubricator as disclosed in August also lacks providing for ready removal from the wheel hub to facilitate easy replacement or lubricant replenishment.

Other wheel bearing lubricators are designed to be pressure-sensitive and, hence, respond to changes in pressure in order to force lubricant onto the wheel bearing. U.S. Pat. No. 5,303,800, issued to Persson, discloses such a wheel bearing lubricator. Again, the wheel bearing lubricator disclosed in Persson does not provide for ready removal for replacement or lubricant replenishment.

Thus, despite the many various types of wheel bearing lubricators available today, none of the lubricators provide for readily removal from the wheel hub for easy lubricant replenishment without requiring a grease gun or complete replacement with a fully-charged wheel bearing lubricator.

Therefore, it is an object of this invention to provide an improvement which overcomes the aforementioned inadequacies of the prior art devices and provides an improvement which is a significant contribution to the advancement of the wheel bearing lubricator art.

Another object of this invention is to provide a detachable wheel bearing lubricator that provides for ready removal from the wheel hub so to facilitate easy lubricant replenishment without the need of a grease gun or other additional device.

Another object of this invention is to provide a detachable wheel bearing lubricator that can be easily removed from the wheel hub and replaced with a second fully-charged wheel bearing lubricator.

Another object of this invention is to provide a detachable wheel bearing lubricator that utilizes an adaptor that releasably couples the wheel bearing lubricator to a wheel hub.

Another object of this invention is to provide a detachable wheel bearing lubricator that can be fully charged with a lubricant prior to being coupled to the wheel hub.

Another object of this invention is to provide a detachable wheel bearing lubricator that utilizes a piston member that is capable of being locked in position to prevent any premature discharge of lubricant prior to being coupled to a wheel hub.

Another object of this invention is to provide a detachable wheel bearing lubricator for lubricating a wheel hub having an outer end, an inner end and an axle assembly having bearings retained therein, the detachable wheel bearing lubricator comprising in combination: a lubrication means for providing a supply of lubricant to the axle assembly retained within the wheel hub; an adaptor means for releasably coupling the lubrication means relative to the wheel hub, the adaptor means being coupled to the outer end of the wheel hub and the lubrication means being releasably coupled to the adaptor means, whereby the lubrication means facilitates the continual lubrication of the axle assembly retained within the wheel hub until the supply of lubricant is depleted whereupon the lubrication means may then be uncoupled from the adaptor means to facilitate the replacement thereof and the replenishing of the supply of lubricant.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention pertains to a detachable wheel bearing lubricator being comprised of a lubrication assembly having a hollow housing that includes a piston member sealingly and slidably mounted within wherein a spring member constantly exerts a force upon said piston member thereby forcing the piston member to translate through the hollow housing. The translation of the hollow housing resultingly forces lubricant positioned within the hollow housing adjacent the piston member to pass onto wheel bearings contained within the wheel hub.

Most importantly, the hollow housing of the detachable wheel bearing lubricator is releasably coupled to an adaptor which is frictionally coupled to the wheel hub. The hollow housing is then threadingly coupled to the adaptor. Thus, when the wheel bearing lubricator is depleted of lubricant, the lubrication assembly can be readily removed and replaced with a second lubrication assembly that is fully charged with lubricant. Alternatively, the lubrication assembly can be readily removed so to be replenished with lubricant and subsequently readily recoupled to the adaptor.

An important feature of the present invention is that the detachable wheel bearing lubricator can be readily removed from the wheel hub so to facilitate easy replacement thereof with a second fully-charged wheel bearing lubricator.

Another important feature of the present invention is that the detachable wheel bearing lubricator provides for readily removal from the wheel hub to facilitate easy lubricant replenishment therein without the need for a grease gun or any other additional devices.

Another important feature of the present invention is that the detachable wheel bearing lubricator provides for full lubricant recharging prior to being releasably coupled relative to the wheel hub. Thus, allowing for multiple fully charged devices to be carried around for ready replacement when needed.

Another important feature of the present invention is that the detachable wheel bearing lubricator provides for the locking of the piston member in position so to prevent any premature discharge of lubricant prior to the lubricator being coupled to the wheel hub.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the invention, reference should be directed to the following detailed description taken in connection with the accompanying drawings in which:

FIG. 1 is an exploded cross-sectional assembly view of the lubrication assembly, the adaptor, the wheel hub and the axle assembly in their relative positions to each other;

FIG. 2 is an end plan view of the lubrication assembly showing the opposite end of the hollow housing, the cross member, the first end of the piston member and the first and second locking tabs in their relative positions to each other;

FIG. 3 is a cross-sectional view taken along line 3—3 as depicted in FIG. 2 showing the first locking tab in engagement with the cross member when the piston member is in the locked position;

FIG. 6 is a cross-sectional view of a third embodiment showing the adapter having external flange threads, a radial flange and a center bore in their relative positions to each other; and FIG. 7 is a cross-sectional view of the lubrication cartridge of the third embodiment illustrating the cavity, the tapered interior surface and the vent hole in their relative positions to each other.

Similar reference characters refer to similar parts throughout the several views of the drawings.

DETAILED DESCRIPTION OF THE PREFERRED EMBODIMENT

Figure 4:
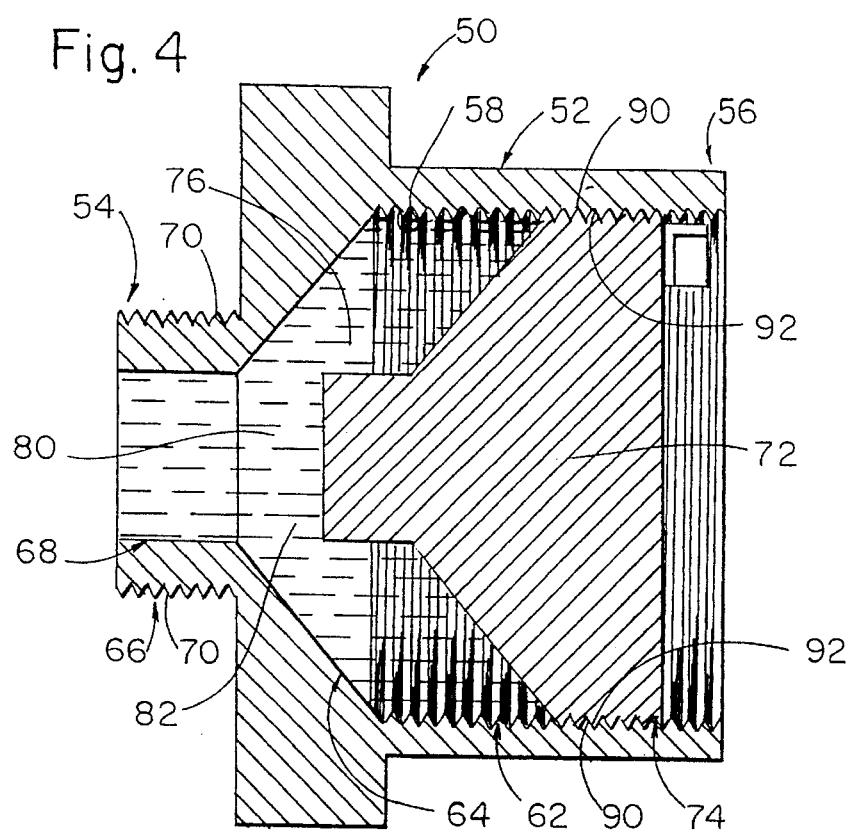
FIG. 4 is a cross-sectional view of the lubrication assembly showing the threads on the internal surface of the hollow housing and the externally-threaded region on the piston member in their relative positions to each other an encompassed within an alternate embodiment.

In referring to FIG. 1, an exploded assembly view can be seen of a wheel hub, generally indicated by reference numeral 5, having an axle assembly, generally indicated by reference numeral 20 positioned within. The wheel hub 5 is that of a standard conventional wheel hub commonly used in the industry. The wheel hub 5 includes a bearing casing 6 having an inner end 7, an outer end 8, an exterior surface 9 and an interior surface 10. The bearing casing 6 is generally cylindrical and hollow in structure.

Positioned adjacent the inner end 7 of the bearing casing 6 is a sealing member 11 that is secured thereto facilitating the sealing thereof. Further, the interior surface 10 can be seen to include a pair of tapered interior surfaces 12 and 13, respectively. As to the outer end 8 of the bearing casing 6, a large center bore 14 is positioned adjacent to and extending into the bearing casing 6 until converging with the tapered interior surface 13. The wheel hub 5 also includes a radially extending structural portion 15 coupled to the bearing casing 6 adjacent the inner end 7. The radially extending structural portion 15 serves to facilitate coupling to a wheel.

The axle assembly 20 contained within the bearing casing 6 is comprised of an axle 21 having an outermost end 22, an inner and outer tapered wheel bearing 23 and 24, respectively, a washer 25 and a retaining nut 26. The inner tapered wheel bearing 23 is positioned on the axle 21 so as to cooperate with the tapered interior surface 12 of the bearing casing 6 and the outer tapered wheel bearing 24 is positioned proximal to the outermost end 22 of the axle 21 so as to cooperate with the tapered interior surface 13 of the bearing casing 6. The washer 25 is positioned on the outermost end 22 of the axle 21 adjacent the outer tapered wheel bearing 24 and the retaining nut 26 is also secured to the axle 21 so as to thereby trap the washer 25 between the outer tapered wheel bearing 24 and the retaining nut 26. The axle assembly 20 is of the standard type commonly used in the industry.

An adaptor means can be seen in relative alignment with the large center bore 14 of the wheel hub 5 and is generally indicated by reference numeral 30. The adaptor means 30 is also referred to herein as the adaptor 30. The adaptor 30 having one end 32 and an other end 34 includes a center bore 36 and a radial flange 38. The radial flange 38 is positioned adjacent the other end 34 and extends outward therefrom. The center bore 36 further includes internal threads 40 extending from the one end 32 to the other end 34. The adapter 30 is preferably formed from a strong structurally rigid metallic material such as steel or the like.

A lubrication means, generally indicated by reference numeral 50 is illustrated in relative alignment with the adaptor 30. The lubrication means 50 is also referred to herein as the lubrication assembly 50. The lubrication assembly 50 is comprised of a hollow housing 52 having an open end 54, an opposite end 56 and an internal surface 58. Coupled to and extending diametrically across the opposite end 56 is a cross member 60. The cross member 60 extends diametrically across a large center bore portion 62 that is positioned at the opposite end 56 and extends inward until converging with a tapered center bore portion 64. The tapered center bore portion 64 decreases in diameter as you progress toward the open end 54 of the hollow housing 52.

Coupled to and extending outward from the open end 54 of the hollow housing 52 is a collar portion 66. The collar portion 66 includes a small center bore portion 68 extending therethrough. Further, to facilitate coupling the hollow housing 52 to the adaptor 30, the collar portion 66 includes external threads 70. At the point of smallest diameter, the tapered center bore portion 64 converges with the small center bore portion 68 of the collar portion 66. Thus, the large center bore portion 62, the tapered center bore portion 64 and the small center bore portion 68 collectively form the internal surface 58 of the hollow housing 52.

Mounted within the hollow housing 52 is a piston member 72 having a first end 74 and a second end 76. The piston member 72 is preferably sealingly and slidably mounted in contact with the internal surface 58 of the hollow housing 52. The piston member 72 is mounted such that the first end 74 of the piston member 72 is positioned adjacent the opposite end 56 of the hollow housing 52.

Interposed between the opposite end 56 of the hollow housing 52 and the first end 74 of the piston member 72 is a spring member 78. The spring member 78 serves to exert constant force on the piston member 72 thereby forcing the piston member 72 to translate towards the open end 54 of the hollow housing 52. The spring member 78 is retained within the hollow housing 52 by way of the cross member 60. The spring member 78 is preferably in the form of a helically-coiled wire spring.

The lubrication assembly 50 further includes a chamber 80 defined by the internal surface 58 proximal to the open end 54 of the hollow housing 52 in cooperation with the second end 76 of the piston member 72. The chamber 80 facilitates the placing of a supply of lubricant 82 therein to be eventually forced out and into the bearing casing 6 of the wheel hub 5. The supply of lubricant 82 is comprised generally of standard axle grease commonly used in the industry.

In referring now to FIGS. 2 and 3, a first locking tab 84 and a second locking tab 86 can be seen in position on the first end 74 of the piston member 72. The first and second locking tabs 84 and 86 overlap and engage the cross member 60 so as to lock the piston member 72 in position. When locked in position, the piston member is prevented from being forcibly translated towards the open end 54 of the hollow housing 52 by the spring member 78 to thereby cause a discharge of the supply of lubricant 82. The first and second locking tabs 84 and 86 are preferably formed from structurally rigid metallic material suitable for securement to the piston member 72.

In addition, the lubrication assembly 50 includes a removable seal 88 positioned at the open end 54 of the hollow housing 52 to facilitate sealing the hollow housing 52. The removable seal 88 serves to retain the supply of lubricant 82 contained within the chamber 80. However, when the lubrication assembly 50 is to be coupled to the adapter 30, the removable seal 88 is first removed so to expose the supply of lubricant 82 therein.

Figure 5:
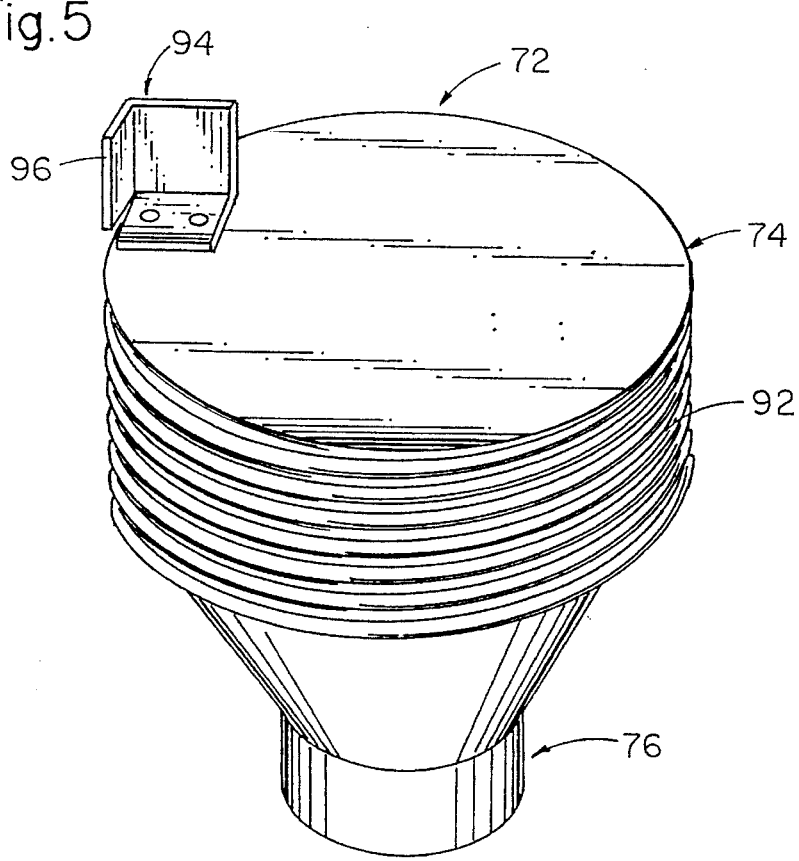
FIG. 5 is an isometric view of the first end of the piston member illustrating the memory retentive tab of in its relative position to the piston member of the alternate embodiment.

In now referring to FIGS. 4 and 5, a second alternate embodiment of the lubrication assembly 50 can be seen. In the alternate embodiment, the lubrication assembly 50 includes threads 90 positioned on the internal surface 58 of the hollow housing 52 adjacent the opposite end 56. An externally-threaded region 92 is further included on the piston member 72 proximal to the first end 74.

In now specifically referring to FIG. 5, a retaining means, generally indicated by reference numeral 94, can be seen in position on the first end 74 of the piston member 72. The retaining means 94 is also referred to herein as a memory retentive tab 94. The memory retentive tab 94 is generally configured in an upright position such that an edge 96 thereon is in angled contact with the threads 90 on the internal surface 58 of the hollow housing 52. The edge 96, being in angled contact with the threads 90, facilitates preventing the piston member 72 from rotating counter-clockwise and advancing toward the opposite end 56 once the piston member 72 has been adjusted. Thus, the piston member 72 is thereby secured by way of the edge 96 of the memory retentive tab 94 frictionally engaging the threads 90 so to oppose any attempted rotational motion by the piston member 72 in a counter-clockwise direction. The memory retentive tab 94 is preferably formed from thin sheet of spring steel.

In addition, a third embodiment can be seen in FIGS. 6 and 7. FIGS. 6 and 7 illustrate the adaptor 100 having external flange threads 102 positioned on a radial flange 104 and the lubrication cartridge 110 of the third embodiment. The lubrication cartridge 110 has a closed end 112 and an internally threaded open end 114. The lubrication cartridge 110 is elongated in shape and has a longitudinal axis.

Positioned between the closed end 112 and the internally threaded open end 114 is a cavity 116. The cavity 116 includes a tapered interior surface 118 such that the diameter of the cavity 116 increases as you progress from the closed end 112 to the internally threaded open end 114. The tapered interior surface 118 serves to force the supply of lubricant 82 towards the open end 114 when the lubrication cartridge 110 is spinning.

Further, the closed end 112 includes a vent hole 120 centered along the longitudinal axis of the lubrication cartridge 110. The vent hole 120 serves to relieve any pressure build up that may develop in the cavity 116 as well as prevent any suction force from developing in the cavity which would allow for free flow of the supply of lubricant 82 out of the cavity 116.

The third embodiment is assembled such that the adaptor 100 is friclionly engaged by the large center bore 14 on the outer end 8 of the bearing casing 6 and the internally threaded end 114 of the lubrication cartridge 110 is then threadably engaged with the external flange threads 102 on the adaptor 100. The adaptor 100 and the lubrication cartridge 110 are preferably formed from a strong structurally rigid metallic material such as steel or the like.

Now that the structure of the present invention has been described in detail, the operation thereof can now be readily understood. In operation, the adaptor 30 is frictionally forced into the large center bore 14 positioned at the outer end 8 of the bearing casing 6 such that the adaptor 30 is securely fixed thereto. The adapter 30 is preferably press fit into the large center bore 14. Next, the lubrication assembly 50 is threadingly and releasably coupled to the other end 34 of the adaptor 30 by way of the external threads 70 on the collar portion 66.

Once the lubrication assembly 50 and the adaptor 30 are secured in place, the piston member 72 is turned clockwise to release the first and second locking tabs 84 and 86 from engagement with the cross member 60 thereby allowing the spring member 78 to exert a constant force on the piston member 72. The constant force on the piston member 72, in turn, forces the translation of the piston member 72 towards the open end 54 of the hollow housing 52. As the piston member 72 moves within the hollow housing 52 toward the open end 54, the supply of lubricant 82 contained within the chamber 80 is forcibly discharged out of the chamber 80 and into contact with the axle assembly 20 contained within the bearing casing 6 of the wheel hub 5.

After a period of use, wherein the supply of lubricant 82 is depleted, the lubrication assembly 50 can be readily disengaged from the adaptor 30 so to facilitate replacement thereof. Once the lubrication assembly 50 has been disengaged from the adaptor 30, the chamber 80 of the lubrication assembly 50 may then be replenished with a supply of lubricant 82 and a removable seal 88 may then be secured to the open end 54 of the hollow housing 52.

Alternatively, the lubrication assembly 50 of the alternate embodiment operates similarly except that the force acting on the piston member 72 to produce a translation of the piston member 72 toward the open end 54 of the hollow housing 52 is provided by way of manually rotating the piston member 72 relative to the hollow housing 52. By rotating the piston member 72 in a clockwise manner, the piston member 72 will gradually translate toward the open end 54 by way of the threads 90 on the hollow housing 52 cooperating with the externally-threaded region 92 on the piston member 72.

In order to preserve the position of the piston member 72 after threaded adjustment, the memory retentive tab 94 presents an edge 96 that remains in angled contact with the threads 90 so to oppose any tendency of the piston member 72 to rotate counter-clockwise. The memory retentive tab 94 will, however, allow rotational movement of the piston member 72 in the clockwise direction. In this embodiment, the lubrication of the axle assembly 20 contained within the bearing casing 6 of the wheel hub 5 is not automatic since a manual turning of the piston member 72 is required. Further, the alternate embodiment does not utilize the spring member 78.

As to the lubrication assembly 50 of the third embodiment, neither a piston member 72 nor a spring member 78 are utilized. The lubrication cartridge 110, having the tapered interior surface 118, inherently forces the supply of lubricant 82 out of the cavity 116 due to centrifical forces developed when the lubrication cartridge 110 is spinning. Hence, the supply of lubricant 82 is centrifically forced outward to the tapered interior surface 118 wherein, due to its tapered nature presenting less resistance towards the internally threaded open end 114, the supply of lubricant 82 resultingly flows therealong. Once the supply of lubricant 82 is depleted, the lubrication cartridge 110 is disengaged and replaced with another fully charged lubrication cartridge 110 or the depleted lubrication cartridge 110 may be replenished with a supply of lubricant 82 and threadably engaged to the adaptor 100 once again.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. A wheel bearing lubricator for lubricating a wheel hub having an outer end, an inner end and an axle assembly having bearings retained therein, said wheel bearing lubricator comprising in combination:

a hollow housing having an open end, an opposite end and an internal surface, said hollow housing further including a cross member coupled to and extending diametrically across said opposite end, and a collar portion coupled to and extending outward from said open end, said collar portion having external threads and a small center bore therein;

a piston member having a first end and a second end sealingly and slidably mounted in contact with said internal surface of said hollow housing with said first end positioned adjacent said opposite end, said piston member further being mounted for translation into position adjacent said open end of said hollow housing, said internal surface of said hollow housing and said second end of said piston member defining a chamber therein;

a spring member interposed between said opposite end of said hollow housing and said first end of said piston member mounted within said hollow housing;

an adapter having one end and an other end, said one end of said adapter being coupled to the outer end of the wheel hub and said other end being coupled to said collar portion of said hollow housing, the adapter further including a center bore and a radial flange, said center bore having internal threads and said radial flange being positioned adjacent said other end; and a supply of lubricant positioned in said chamber to facilitate lubricating the bearings, whereby said spring member exerts force on said piston member so to force said piston member towards said open end of said hollow housing thereby forcing said supply of lubricant into the wheel hub whereupon when said supply of lubricant is depleted said hollow housing may then be readily uncoupled from said adapter to facilitate the replacement thereof and the replenishing of said supply of lubricant.

2. A wheel bearing lubricator for lubricating a wheel hub having an outer end, an inner end and an axle assembly having bearings retained therein, said wheel bearing lubricator comprising in combination:

a lubrication means for providing a supply of lubricant to the axle assembly retained within the wheel hub;

an adapter means for releasably coupling said lubrication means relative to the wheel hub, said adapter means being coupled to the outer end of the wheel hub and said lubrication means being releasably coupled to said adapter means, whereby said lubrication means facilitates the continual lubrication of the axle assembly retained within the wheel hub until said supply of lubricant is depleted whereupon said lubrication means may then be readily uncoupled from said adapter means to facilitate the replacement thereof and the replenishing of said supply of lubricant.

3. The wheel bearing lubricator as recited in claim 2, wherein said lubrication means is comprised of a hollow housing having an open end, an opposite end and an internal surface, a piston member having a first end and a second end, said piston member being sealingly and slidably mounted in contact with said internal surface within said hollow housing with said first end positioned adjacent said opposite end, and a spring member interposed between said opposite end and said first end of said piston member.

4. The wheel bearing lubricator as recited in claim 3, wherein said hollow housing further includes a collar portion coupled to and extending outward from said open end, said collar portion having external threads thereon.

5. The wheel bearing lubricator as recited in claim 3, wherein said internal surface of said hollow housing proximal to said open end and said second end of said piston member cooperate to define a chamber therein.

6. The wheel bearing lubricator as recited in claim 5, wherein said lubrication means further includes a supply of lubricant positioned in said chamber to facilitate lubricating the bearings.

7. The wheel bearing lubricator as recited in claim 2, wherein said adapter means comprises an adapter having one end, an other end, a center bore and a radial flange, said center bore including internal threads and said radial flange being positioned adjacent said other end.

8. The wheel bearing lubricator as recited in claim 3, wherein said spring member comprises a helically coiled wire spring.

9. The wheel bearing lubricator as recited in claim 6, wherein said opposite end of said hollow housing includes a cross member coupled to and extending diametrically across said opposite end.

10. The wheel bearing lubricator as recited in claim 9, wherein said first end of said piston member includes a first and a second locking tab extending outward therefrom to facilitate engaging said cross member so to thereby releasably lock said piston member in place and prevent premature discharge of said supply of lubricant.

11. The wheel bearing lubricator as recited in claim 3, wherein said hollow housing includes threads positioned on said internal surface extending from said opposite end to an intermediate point between said opposite and said open ends, and said piston member further including an externally threaded region positioned adjacent said first end, whereby said piston member is threadedly and sealingly mounted within said hollow housing.

12. The wheel bearing lubricator as recited in claim 11, wherein said piston member further includes a retaining means coupled thereto to facilitate retaining said piston member in position after threaded adjustment.

13. The wheel bearing lubricator as recited in claim 12, wherein said retaining means comprises a memory retentive tab coupled to said first end of said piston member, said memory retentive tab standing upright transverse to said first end and having an edge thereon in angled contact with said threads positioned on said internal surface of said hollow housing, said piston member thereby being prevented from rotating and moving toward said opposite end once adjusted.

14. The wheel bearing lubricator as recited in claim 3, wherein said hollow housing further includes a removable seal positioned at said open end to facilitate sealing said hollow housing, wherein said removable seal is removed to expose said supply of lubricant before coupling said hollow housing to said adapter means.

15. The wheel bearing lubricator as recited in claim 2, wherein said lubrication means is comprised of a lubrication cartridge having a closed end, an internally threaded open end, a cavity and a longitudinal axis, said cavity being positioned centrally between said closed and internally threaded open ends, said cavity further having a tapered interior surface increasing in diameter from the closed end to the open end, whereby centrifical forces developed due to the spinning of said lubrication cartridge forces said supply of lubricant outward onto and along said tapered interior surface towards said open end.

16. The wheel bearing lubricator as recited in claim 15, wherein said closed end further includes a vent hole centered along the longitudinal axis of the lubrication cartridge, said vent hole facilitating relieving pressure in said cavity as well as allowing for free flow of said supply of lubricant out of said cavity.

17. The wheel bearing lubricator as recited in claim 16, wherein said adaptor means is comprised of an adaptor having one end, an other end, a radial flange positioned adjacent and extending outward from said other end and external flange threads positioned on said radial flange, wherein said external flange threads threadably engage said internally threaded open end of said lubrication cartridge and said one end is frictionly received by the outer end of the wheel hub.

* * * * *